US011987853B2

(12) United States Patent
Valery et al.

(10) Patent No.: US 11,987,853 B2
(45) Date of Patent: *May 21, 2024

(54) METHOD FOR CHROMATOGRAPHIC PURIFICATION OF VISCOUS LOADS

(71) Applicant: NOVASEP PROCESS SOLUTIONS, Saint-Maurice-de-Beynost (FR)

(72) Inventors: Eric Valery, Lyons (FR); Cédric Prieur, Genas (FR)

(73) Assignee: NOVASEP PROCESS SOLUTIONS, Saint-Maurice-de-Beynost (FR)

( * ) Notice: Subject to any disclaimer, the term of this patent is extended or adjusted under 35 U.S.C. 154(b) by 792 days.

This patent is subject to a terminal disclaimer.

(21) Appl. No.: 17/047,672

(22) PCT Filed: Apr. 22, 2019

(86) PCT No.: PCT/EP2019/060255
§ 371 (c)(1),
(2) Date: Oct. 14, 2020

(87) PCT Pub. No.: WO2019/206842
PCT Pub. Date: Oct. 31, 2019

(65) Prior Publication Data
US 2021/0032711 A1 Feb. 4, 2021

(30) Foreign Application Priority Data
Apr. 23, 2018 (EP) .................... 18305503

(51) Int. Cl.
*C13K 11/00* (2006.01)
*B01D 15/18* (2006.01)
(Continued)

(52) U.S. Cl.
CPC ............ *C13K 11/00* (2013.01); *B01D 15/185* (2013.01); *B01D 15/1871* (2013.01); *B01D 15/426* (2013.01); *C13K 1/00* (2013.01)

(58) Field of Classification Search
CPC . C13K 11/00; C13K 1/00; C13K 1/08; C13K 3/00; B01D 15/185; B01D 15/1871;
(Continued)

(56) References Cited
U.S. PATENT DOCUMENTS 4,366,060 A * 12/1982 Leiser ................ B01D 15/362
210/659
4,373,025 A 2/1983 Neuzil et al.
(Continued)

FOREIGN PATENT DOCUMENTS

| CN | 101668867 A | 3/2010 |
| CN | 201801525 U | 4/2011 |

(Continued)

OTHER PUBLICATIONS

PCT International Search Report and Written Opinion for International Application No. PCT/EP2019/060255, entitled "Method For Chromatographic Purification Of Viscous Loads," dated Jul. 11, 2019, 15 pages.

(Continued)

*Primary Examiner* — Ekandra S. Miller-Cruz
(74) *Attorney, Agent, or Firm* — Hamilton, Brook, Smith & Reynolds, P.C.

(57) ABSTRACT

The invention relates to a method for purifying a mixture to be separated, in a multicolumn chromatography system, the method comprising successively and cyclically:
a step of collecting a raffinate, a step of injecting the mixture to be separated, a step of collecting an extract and an eluent injection step, at an operating temperature;
wherein the mixture to be separated has a viscosity at 20° C. greater than or equal to 3 mPa·s; and wherein the dry matter mass concentration of the mixture to be separated is equal, within 5%, to a threshold concentration, said threshold concentration is such that:

(Continued)

the viscosity of the mixture to be treated at a dry matter mass concentration equal to the threshold concentration and at the operating temperature, is equal to twice the viscosity of the mixture to be treated, at a dry matter mass concentration equal to 85% of the threshold concentration and at the operating temperature.

12 Claims, 2 Drawing Sheets

(51) Int. Cl.
*B01D 15/42* (2006.01)
*C13K 1/00* (2006.01)

(58) Field of Classification Search
CPC .............. B01D 15/426; B01D 15/361; B01D 15/1821; B01D 15/10; B01D 15/424; C13B 20/148
USPC .......................................................... 127/53
See application file for complete search history.

(56) References Cited

U.S. PATENT DOCUMENTS

| 5,221,478 | A | * | 6/1993 | Dhingra ................. C13K 11/00 210/656 |
| 5,234,503 | A | | 8/1993 | Lillard, Jr. et al. |
| 9,441,280 | B2 | | 9/2016 | Pease et al. |
| 11,661,635 | B2 | | 5/2023 | Ebran et al. |
| 2004/0231662 | A1 | | 11/2004 | De Mendonca Ferreira et al. |
| 2006/0273013 | A1 | * | 12/2006 | Chin .................... B01D 53/047 210/659 |
| 2017/0304745 | A1 | | 10/2017 | Binder et al. |
| 2021/0102266 | A1 | | 4/2021 | Ebran et al. |
| 2021/0164007 | A1 | | 6/2021 | Brichant et al. |

FOREIGN PATENT DOCUMENTS

| CN | 102876758 | A | | 1/2013 | |
| CN | 103060482 | A | | 4/2013 | |
| CN | 104630312 | A | | 5/2015 | |
| CN | 204625637 | U | | 9/2015 | |
| CN | 105177087 | A | | 12/2015 | |
| CN | 210826190 | U | | 6/2020 | |
| FR | 2 377 827 | A1 | | 8/1978 | |
| FR | 2 668 775 | A1 | | 5/1992 | |
| WO | 92/07097 | | | 4/1992 | |
| WO | 03/016577 | A1 | | 2/2003 | |
| WO | 2014/030030 | A1 | | 2/2014 | |
| WO | 2015/0434643 | A1 | | 3/2015 | |
| WO | 2015/104464 | A1 | | 7/2015 | |
| WO | WO-2016061037 | A1 | * | 10/2015 | ............ B01D 15/18 |
| WO | 2016/061037 | A1 | | 4/2016 | |

OTHER PUBLICATIONS

Chinese First Office Action, Appl. 201810871420.5 with English translation of Chinese First Office Action dated Mar. 15, 2022.
Nicoud, "Chromatographic Methods, Modeling, Simulation and Design," Cambridge University Press, 2015, p. 530-531.
International Search Report and Written Opinion for International Application No. PCT/EP2019/060256, filed Apr. 22, 2019, entitled "Method For Making Fructose From Glucose", dated May 29, 2019, 13 pages.
International Search Report and Written Opinion for Int'l Application No. PCT/EP2019/060254, entitled "Fructose Purification Method", 13 pages, dated Jul. 11, 2019.
Silva, et al., "Effect of Dead Volumes on the Performance of an Industrial-Scale Simulated Moving-Bed Parex Unit for p-Xylene Purification," AIChE Journal, vol. 62, No. 1, pp. 241-255 (Jan. 2016).
Notification of the First Office Action, issued for Chinese Application No. 201810870145.5, entitled "Method for Producing Fructose from Glucose," dated Oct. 14, 2022.

* cited by examiner

Bed volume (volume of mobile phase/volume of stationary phase) per period

METHOD FOR CHROMATOGRAPHIC PURIFICATION OF VISCOUS LOADS

This application is the U.S. National Stage of International Application No. PCT/EP2019/060255, filed Apr. 22, 2019, which designates the U.S., published in French, and claims priority under 35 U.S.C. § 119 or 365(c) to European Application No. 18305503.7, filed Apr. 23, 2018. The entire teachings of the above applications are incorporated herein by reference.

SCOPE OF THE INVENTION

The present invention relates to a method for purifying a mixture to be separated, in a multicolumn chromatography system, the mixture to be separated being a viscous feedstock. This purification method may, in particular, be applied to the production of a fructose composition from a glucose composition.

TECHNICAL BACKGROUND

In the food industry, there is a significant use of fructose-based compositions especially known under the designation HFS for "High Fructose Syrup". In particular, under the designation HFS 55 is known a composition comprising about 55% by mass of fructose relative to the total dry matter, and under the designation HFS 95 is known a composition comprising at least 95% by mass of fructose relative to the total dry matter.

It is known to manufacture the compositions HFS 55 and HFS 95 by isomerization from a glucose-based composition. Traditionally, the manufacturing method includes a first evaporation to concentrate the glucose-based composition, then an isomerization step, then another evaporation to carry-out a second concentration, then a chromatographic purification making it possible to separate a fructose-enriched flow from a glucose-enriched flow, and another evaporation to carry-out a third concentration from the fructose-enriched flow.

This method requires a relatively heavy installation and involves significant energy consumption.

There is thus a need to produce fructose-based compositions, such as HFS composition 55 or HFS 95 composition, with greater efficiency (and for example with lower energy consumption).

More generally, there is a need to purify viscous mixtures to be separated with improved efficiency (e.g. with lower energy consumption) and/or reduced column chromatography dimensions.

SUMMARY OF THE INVENTION

The invention relates firstly to a method for purifying a mixture to be separated in a multicolumn chromatography system, the method comprising successively and cyclically:
- a step of collecting a raffinate, a step of injecting the mixture to be separated, a step of collecting an extract and a step of injecting eluent, at an operating temperature;
- wherein the mixture to be separated has a viscosity at 20° C. greater than or equal to 3 mPa·s; and wherein the dry matter mass concentration of the mixture to be separated is equal, within 5%, to a threshold concentration, said threshold concentration being such that:
  the viscosity of the mixture to be treated, at a dry matter mass concentration equal to the threshold concentration and at the operating temperature, is equal to twice the viscosity of the mixture to be treated, at a dry matter mass concentration equal to 85% of the threshold concentration and at the operating temperature.

In some embodiments, the dry matter mass concentration of the mixture to be separated is equal, within 2%, to the threshold concentration, and preferably the dry matter mass concentration of the mixture to be separated is approximately equal to the threshold concentration.

In some embodiments, the operating temperature is greater than or equal to 50° C., preferably greater than or equal to 55° C., and more preferably greater than or equal to 60° C.

In some embodiments, the multicolumn chromatography system comprises from 4 to 6 cells; and/or comprises columns having a length from 1.0 to 2.6 m, preferably from 1.4 to 2.0 m.

In some embodiments:
the injected volume of eluent is from 0.12 to 0.22 BV; and/or
the injected volume of mixture to be separated is from 0.13 to 0.40 BV.

In some embodiments, the eluent is water; and preferably the mixture to be separated is an aqueous composition comprising sugars.

In some embodiments, the mixture to be separated has a dry matter mass concentration from 45 to 55%, and preferably about 50%.

In some embodiments, the mixture to be separated comprises glucose and fructose, the extract being enriched in fructose and the raffinate being enriched in glucose.

In some embodiments, the extract contains a mass proportion of fructose, relative to the total dry matter, greater than or equal to 95%, preferably greater than or equal to 98%.

In some embodiments, at least 85% by mass of the fructose contained in the mixture to be separated is recovered in the extract.

In some embodiments, the mixture to be separated comprises:
- a mass proportion of glucose relative to the total dry matter from 40 to 65%, preferably from 45 to 60%, more preferably from 50 to 55%; and/or
- a mass proportion of fructose relative to the total dry matter from 30 to 55%, preferably from 35 to 50%, more preferably from 40 to 45%.

In some embodiments, the multicolumn chromatography system comprises a plurality of columns and intercolumn fluidic links, and the velocity of the fluids in the intercolumn fluidic links is greater than 0.5 m/s, preferably greater than 1 m/s and more preferably greater than 1.5 m/s.

In some embodiments, the multicolumn chromatography system comprises a plurality of columns and intercolumn fluidic links, and the volume of the intercolumn fluidic links is less than 10%, preferably less than 5% and preferably less than 3% of the volume of the columns.

The object of the invention is also a method for preparing a production of a fructose composition comprising the following successive stages:
- supply of an initial composition;
- hydrolysis, isomerization, concentration by evaporation and/or demineralization of the initial composition to obtain an intermediate composition;
- purification of the intermediate composition as a mixture to be separated according to the method described above, making it possible to obtain a glucose-rich raffinate and a fructose-rich extract;

concentration of the extract by evaporation of water.

In some embodiments, the method further comprises a residual color removal step of the extract prior to the concentration step of the extract, preferably by ion exchange resin and/or by activated carbon as well as preferably, a sterile filtration step.

In some embodiments, the raffinate is recycled and added to the initial composition prior to the concentration step of the initial composition.

In some embodiments:
- the initial composition has a dry matter mass concentration from 25 to 35%, preferably about 31%; and/or
- the concentrated initial composition has a dry matter mass concentration greater than or equal to 40%; and/or
- the intermediate composition comprises at least 40% by mass of fructose relative to the total dry matter; and/or
- the fructose composition obtained has a dry matter mass concentration greater than or equal to 75%, preferably about 77%.

In some embodiments:
- the produced fructose composition contains a mass proportion of fructose, relative to the total dry matter, greater than or equal to 95%, preferably greater than or equal to 98%; or
- a part of the intermediate composition is collected prior to the purification step and added to the extract prior to the concentration step of the extract, the produced fructose composition preferably containing a mass proportion of fructose, relative to the total dry matter, from 50 to 60%, more preferably from 54 to 56%; and the volume ratio of the intermediate composition part collected from the total intermediate composition being preferably from 0.4 to 0.6, more preferably from 0.45 to 0.55, preferably 0.49.

In some embodiments, the method comprises injecting water as an eluent in the purification step, the ratio of mass flow rate of eluent to the mass flow rate of dry matter of the produced fructose composition being from 0.5 to 1.3, preferably from 0.6 to 1.2.

The present invention makes it possible to meet the need expressed in the prior art. It more particularly provides a method for purifying a viscous mixture to be separated, offering improved efficiency (for example with a lower energy consumption).

In particular, the invention is applicable to a method for producing a fructose-based composition, such as a HFS 55 or a HFS 95 composition, and makes it possible to render this method more efficient.

The invention is based on the observation that, when a chromatographic column is loaded with a viscous mixture to be separated, such as a sugar solution, elution with a less viscous fluid such as water gives rise to a phenomenon of viscous digitation. Veins of low-viscosity liquid are created in the column and pass through it, impairing uniform rinsing on the whole section of the column. This phenomenon may result in a dramatic drop in the efficiency of the column and thus the purities and/or yields obtained.

Reducing the concentration of the mixture to be separated makes it possible to reduce the viscosity thereof and thus to limit the phenomenon of viscous digitation. On the other hand, reducing the concentration of the mixture to be separated tends to reduce the performance of the separation.

In general, in an industrial separation method, the custom is to operate at the highest possible concentration for the mixture to be separated. Reference is made in this regard to *Chromatographic Processes, Modeling, Simulation and Design*, by Roger Marc Nicoud, Cambridge University Press, 2015, p. 530-531. It is explained in this work that the concentration of the feedstock must be as high as possible, a high limit of this concentration being associated with risks of miscibility or too much pressure in the column.

In contrast to custom, the present invention allows for optimum separation, by working at an optimal or quasi-optimal concentration, considering the viscous digitation (i.e. working in the highest possible concentration range, without however obtaining a significant viscous digitation effect).

The invention thus makes it possible to reduce the volume of eluent consumed (and therefore the energy consumption), and/or to reduce the volume of stationary phase used, and/or to increase the volume of feedstock to be treated, and/or to reduce the size of the chromatographic columns, and, if necessary, with a more compact and less expensive production installation.

DESCRIPTION OF EMBODIMENTS OF THE INVENTION

The invention will now be described in more detail and without limitation in the description which follows.

Highlighting the Phenomenon of Digitation

The digitation phenomenon mentioned above may be highlighted, for example, by saturating a chromatographic column with a viscous feedstock, for example an aqueous sugar solution, then by proceeding to an elution, for example with water.

Figure 1:
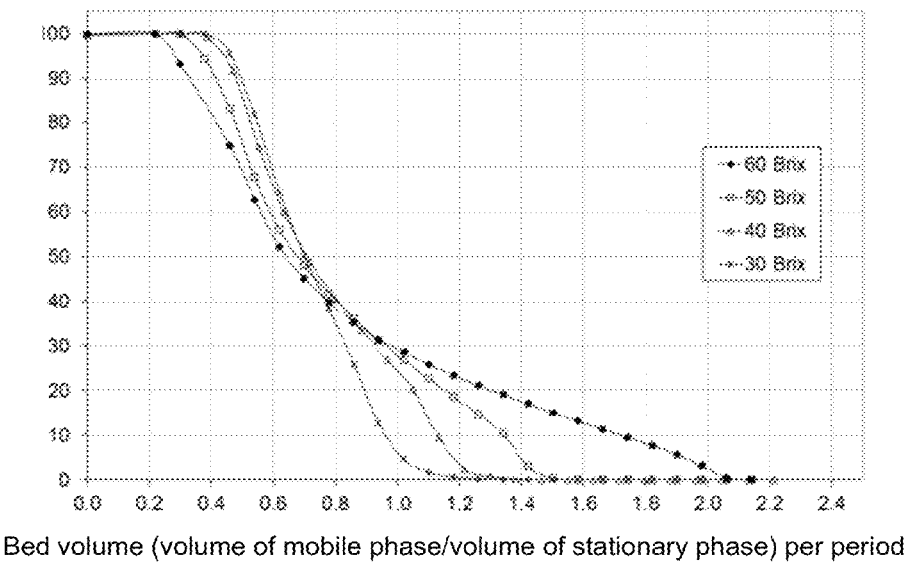
FIG. 1 is a graph illustrating the phenomenon of digitation, showing different elution fronts of sugar compositions at different concentrations, in a chromatographic column. The mass concentration in sugar of the solution collected from the column outlet is shown on the ordinate (as a percentage relative to the concentration of the feedstock), and the volume of eluent is shown on the abscissa (in BV).

FIG. 1 shows the appearance of the elution fronts thus obtained, with feedstock ranging from 60 to 30 Brix degrees.

In this example, at 60 Brix, the diluted sugar begins to exit the column at an eluent volume of 0.3 BV, and the water rinsing of the column is terminated at an eluent volume greater than 2 BV. At 30 Brix, the rinsing front is much narrower. The same test carried out at 20 Brix shows exactly the same curve as at 30 Brix. Thus, the digitation phenomenon is totally eliminated if one uses a feedstock of sugar less than or equal to 30 Brix.

In general, the performance of a chromatographic separation decreases if the feedstock is diluted; however, since the dilution reduces the digitation phenomenon, this loss of performance may be offset to a certain degree of dilution. The object of the invention is to perform the chromatographic separation at an optimal or almost optimal feedstock concentration.

The present inventors have empirically found how to determine this optimal feedstock concentration at a given temperature T. This optimal concentration, which may be described as a limiting digitation concentration $C_d$, may be determined by measuring the viscosity of the feedstock at different dry matter concentrations, i.e. at different degrees of dilution. The concentration $C_d$ is defined as that at which the viscosity of the feedstock ($\eta$) is twice the viscosity of the feedstock at a concentration reduced by 15% relative to $C_d$. In other words, the concentration $C_d$ is that for which the following equality is satisfied: $\eta(C_d, T)=2\times\eta(0.85\times C_d, T)$. It has been found that the $C_d$ concentration is that from which (i.e. below which) the impact of the digitation becomes extremely low.

At concentrations $C>C_d$, it is found that $\eta(C, T)$ is greater than $2\times\eta(0.85\times C, T)$. In this arrangement, the impact of the digitation is non-negligible and degrades the performance of the chromatographic separation.

At concentrations $C<C_d$, we find that $\eta(C, T)$ is less than $2\times\eta(0.85\times C, T)$. In this arrangement, the impact of digitation is negligible, but it is not favorable to work at very low concentrations because of the degradation of performance that this entails.

The viscosity in question in the present application is the dynamic viscosity expressed for example in mPa·s.

The document *Viscosities of Sucrose Solutions at Various Temperatures: Tables of Recalculated Values, Supplement to the National Bureau of Standards Circular* 440, dated Jul. 31, 1958 (J. F. Swindells et al.), is an example of a compilation of viscosity values obtained for sugar solutions at different concentrations and temperatures. From data of this type, it is possible to calculate the $C_d$ concentration for a given composition.

In the context of the invention, the feedstock to be treated comprises dry matter in a solvent. Preferably, this solvent is water or an aqueous solution. It should be understood that in the foregoing explanations, viscosity measurements at different concentrations of the feedstock (or at different degrees of dilution of the feedstock) are carried out with the same solvent. For example, from an aqueous composition at a given dry matter mass concentration, it is possible to obtain an aqueous composition of higher dry matter mass concentration by evaporation, or, on the contrary, a aqueous composition of lower concentration of dry matter by dilution with additional water.

The digitation phenomenon described above has also been observed by the present inventors on numerous other mixtures comprising a relatively high viscosity, due to the presence of at least one compound in the mixture conferring such a relatively high viscosity, such as in particular a glycol (for example monoethylene glycol), a C5 or C6 monosaccharide (for example arabinose, maltose, glucose, xylose, fructose, allulose, ribose), a disaccharide or oligosaccharide (for example gluco-oligosaccharide, fructooligosaccharide), or a polyol (for example glycerol, erythritol, cyclitol).

The invention therefore applies in particular to the purification of a compound above from another compound above; or the purification of a compound above from compounds without significant impact on the viscosity of the mixture to be separated (for example salts or organic acids).

Chromatographic Purification

The chromatographic purification of the invention is carried out in an assembly of several chromatographic columns containing a stationary phase, with successively and cyclically, in a given part of the system:
- a step of collecting a raffinate, a step of injecting the mixture to be separated, a step of collecting an extract and an eluent injection step.

The various steps above follow one another temporally in one part of the system. This part of the system in question is preferably located between the outlet of one column and the inlet of the next column. Alternatively, the part of the system in question may include a column or part of a column.

At a given instant, one or more of the above steps may be simultaneously implemented in one or more parts of the system. For example, all of these steps may be simultaneously implemented in respective parts of the system.

The "mixture to be separated", or "feedstock", or "feedstock to be treated" is the mixture containing a product of interest and at least one impurity which is subjected to the chromatographic purification. The purification is meant to enrich a fraction (the extract or raffinate) in said product of interest.

By "raffinate" is meant the fraction obtained by elution which contains the species relatively least retained by the stationary phase, and therefore whose elution is the fastest.

By "extract" is meant the fraction obtained by elution which contains the species relatively most retained by the stationary phase, and therefore whose elution is the slowest.

By "enriched" fraction in a species A and "depleted" in a species B, is meant that the ratio of species A/species B molar concentrations in the fraction is greater than that of the input flow of the chromatographic purification (independently of the effects of concentration or overall dilution).

The eluent is a fluid injected to displace the species retained by the stationary phase. In the invention, the eluent used is preferably an aqueous solution, or water.

By "mobile phase" is meant the fluid that displaces in the columns of the system. Depending on its position, each column is traversed by a mobile phase volume depending on the zone in which the column is located, wherein this volume may be different from the volume of eluent which is injected into one or another of the columns. In the case of a multicolumn method with identified zones between the input and output lines (as described in more detail below), the term "mobile phase volume" designates the volume of fluid which enters a zone. This fluid may be different from the eluent in the strict sense, but it contributes to the displacement of the products in each column of the zone. This is referred to as the mobile phase volume associated with each zone. The preferred configuration of the zones in the chromatographic system is described in more detail hereafter.

In certain advantageous embodiments, the chromatographic system comprises sequencing members of the injection and collection lines. In particular, the sequencing of these injection and collection lines takes place over an operating cycle of the system. In the present application, an "operating cycle" or "cycle" designates the time at the end of which the injection and collection lines have been sequenced until they return to their initial position in the system. At the end of a cycle, the system is back to its original configuration. A cycle generally comprises as many "periods" as columns. Thus the cycle of a method implemented on an 8-column system is composed of 8 successive periods.

The unit BV ("Bed Volume") makes it possible to measure the volume of mobile phase circulating in each zone (or of injected eluent, or of injected feedstock to be treated), relative to the volume of the stationary phase bed in a column. The measurement of these volumes is per period.

The stationary phase used in the invention may be a cationic, anionic, strong or weak resin, or a mixture thereof, having a particle size (Dv50) comprised between 100 and 600 μm, preferably between 170 and 400 μm.

The chromatographic purification of the invention is implemented in a multicolumn chromatographic system. Preferably, the chromatographic system comprises from 4 to 10 columns.

Preferably, the chromatographic purification of the invention is carried out continuously.

Preferably, the chromatographic purification of the invention is a periodic chromatographic accumulation method.

By "accumulation method" is meant a chromatographic method in which the injection of the mixture to be separated (starting flow) is intercalated or added to a non-zero concentration profile passing from the outlet to the inlet of a column.

Examples of such accumulation methods are AMB, SMB, VariCol, Powerfeed, ModiCon, iSMB or SSMB methods.

The simulated moving bed (or SMB for "simulated moving bed") method is a continuous multicolumn method, wherein the injection of the mixture to be separated being carried out over an entire cycle.

The SMB method may be, notably, a four-zone SMB method. In this case, the system comprises a set of columns connected in series and closed loop, the outlet of a column being connected to an inlet of a next column. The system includes at least one injection line for the mixture to be separated, a collection line of a raffinate, an injection line of an eluent and a collection line of an extract. The injection lines (flow and eluent) and the collection lines of the fractions are displaced periodically and synchronously (synchronous sequencing) within the loop in the direction of the flow of the fluid circulating through the loop. The duration between two offsets of the assembly of the injection and collection lines of a column corresponds to a period; at the end of a cycle after all the points have returned to their initial position, the system having a cyclic operation. A cycle has as many periods as columns.

An AMB system (or actual moving bed) has a similar operation to an SMB system. However, instead of moving the injection points of the feedstock and eluent flow, as well as collection points, by means of a valve system, a set of adsorption units (columns) are moved physically relative to the feeding and collection points. Again, the operation makes it possible to simulate a continuous moving bed against the current.

The chromatographic purification of the invention may be a continuous injection method of the mixture to be separated (i.e. a method in which the injection of the mixture to be separated is a continuous flow). The injection of the mixture to be separated is thus carried out throughout the cycle. The chromatographic purification of the invention may also be a quasi-continuous injection method of the mixture to be separated.

Alternatively, the chromatographic purification of the invention may be a method in which the injection of the mixture to be separated (starting flow) is discontinuous. In these methods, the injection of the mixture to be separated is not made over an entire cycle, but for a total duration of less than one cycle. A discontinuous injection method of the mixture to be separated is the iSMB ("improved simulated moving bed") method described in documents EP 0342629 and U.S. Pat. No. 5,064,539, to which reference is expressly made, may be mentioned. In this method, in one-step the system operates in a closed loop, without injection or product collection.

The sequential SMB method, or SSMB ("sequential simulated moving bed") is another preferred example. An SSMB system cuts out introductions and collections of the flows into sub-sequences applied in periodic ways. An SSMB system is, for example, described in document WO 2015/104464.

Preferably, the chromatographic purification of the invention is a method of the SSMB type.

The chromatographic system preferably comprises zones 1, 2, 3 and 4: zone 1 is located between an injection line of an eluent and a collection line of the extract; zone 2 is located between the collection line of the extract and an injection line of the mixture to be separated; zone 3 is located between the injection line of the mixture to be separated and a collection line of the raffinate; and zone 4 is located between the collection line of the raffinate and the injection line of an eluent.

Figure 2:
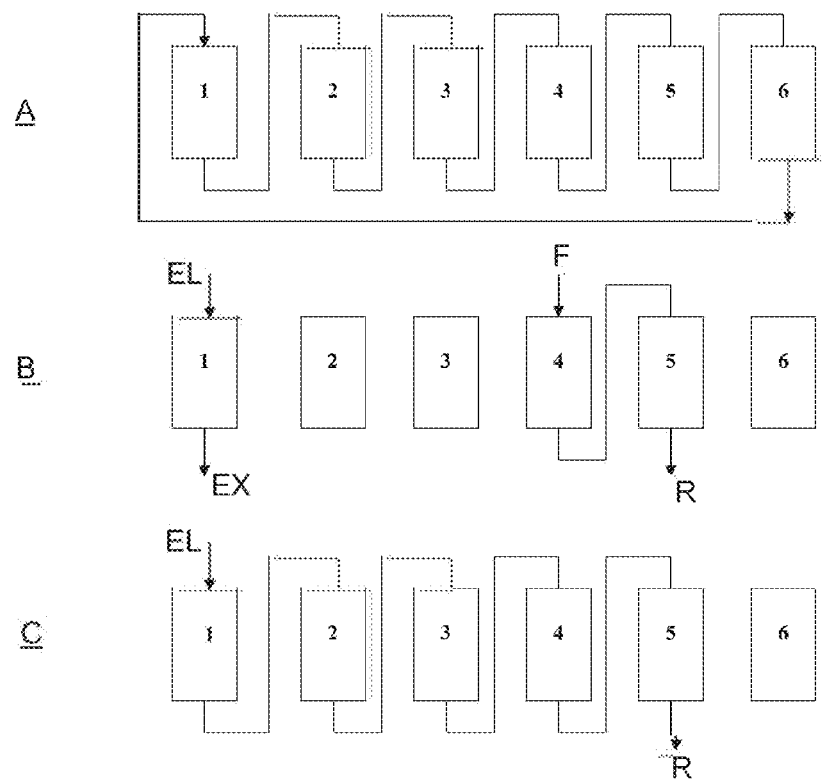
FIG. 2 schematically shows an SSMB chromatographic system that may be used to implement the method of the invention.

A possible example of an SSMB system that may be used in the invention is shown with reference to FIG. 2. In this example, six cells or columns are used. This system may be operated according to a cyclic operation in four phases.

Phase 1 (part A of the figure): loop phase, during which a continuous closed loop circulation is maintained on all the cells placed in series, to displace the interstitial volume of one cell to the next, without the injection of eluent. The skilled in the art will note that the volume of mobile phase displaced in this phase contributes to zones 1, 2, 3 and 4.

Phase 2 (part B of the figure): feedstock/feedstock injection. The feedstock flow (F) is injected at the top of the fourth cell. Simultaneously, a substantially identical volume of raffinate (R) is collected at the outlet of the fifth cell. The cells 4 and 5 here constitute zone 3. The cells 2 and 3 constitute the separation zone between the extract and the feedstock injection. They constitute zone 2 here. The skilled in the art will note that the volume of mobile phase displaced in this phase contributes to zone 3.

Phase 3 (part B of the figure): elution of the extract. The eluent (EL) is injected onto the first cell to elute the extract (EX), which is collected in a substantially identical volume at the bottom of the first cell. The cell No. 1 here constitutes zone 1. The skilled in the art will note that the volume of mobile phase displaced in this phase contributes to zone 1.

Phases 2 and 3 are preferably operated simultaneously to increase the productivity of the system.

Phase 4 (part C of the figure): elution of the raffinate. The eluent (EL) is injected at the top of the first cell, and the raffinate (R) is collected in a substantially identical volume out of the fifth. Cell No. 6 is here a buffer cell allowing to ensure the separation between the tail of the extract and the head of the raffinate. It constitutes zone 4. This zone may be omitted in the case where the degree of purity and/or the desired yield is relatively limited. The skilled in the art will note that the volume of mobile phase displaced in this phase contributes to zones 1, 2 and 3.

These phases are operated in the order from 1 to 4 in a preferred embodiment. Their sequence constitutes a complete sequence (also called period).

Each sequence (phases 1 to 4) is repeated six times by shifting the cell inlets and outlets by incrementing the cell number, from the left to the right of the system: the feedstock is thus injected at the top of cell No. 1 in sequence No. 1, then at the top of cell No. 2 in sequence No. 2, etc.

A complete production cycle is carried out after completion of the six successive sequences, when the injection point of the feedstock, initially at the inlet of cell No. 1, returns again to the inlet of cell No. 1.

In the foregoing, a description of the SSMB system has been given with reference to the case where the cells correspond to columns. This is not limiting, and the invention also applies to systems in which the cells, or even compartments, are parts of the column.

Moreover, the number of columns present in zones 1, 2, 3 and 4 may vary according to the desired quality of separation. Therefore, systems of the same type with a cell, two cells, three cells, four cells, five cells, six cells, and up to twelve cells or more may also be designed.

The columns may have notably a length of 1 to 2.6 m, namely: from 1.0 to 1.2 m, or from 1.2 to 1.4 m, or from 1.4 to 1.6 m, or from 1.6 to 1.8 m, or from 1.8 to 2.0 m, or from 2.0 to 2.2 m, or from 2.2 to 2.4 m, or from 2.4 to 2.6 m; a range of 1.4 to 2.0 m is considered preferable. The length in question is the useful length of the column, corresponding to the height of the stationary phase bed in the column.

As described above and as illustrated in the examples below, the invention makes it possible to improve the performance of the chromatographic installation. However, performance losses may be encountered during a change of scale of the installation. In particular, when the diameter of the columns exceeds about one meter in diameter, it may be crucial to control the dead volumes.

The dead volumes correspond to the total (internal) volume of the "intercolumn fluidic links", i.e. the links between the output or outputs of a column and the input or inputs of the next column. Any element located between two successive columns, such as a pipe (or conduit), a valve or a pump, belongs to the intercolumn fluidic links. Volumes found after a collection valve of an extract or raffinate, or before injection valves are not considered as dead volumes (volumes located between the chromatography system and storage tanks for the feedstock to be injected, eluent, extract and raffinate).

It is advantageous for the velocity of the fluids flowing in the inter-column fluidic connections, and, in particular, in the pipes or conduits thereof, to exceed 0.5 m/s, preferably 1 m/s and more preferably 1.5 m/s. The fluid velocity considered here is the average velocity (flow divided by the cross section).

The control of the velocity in the inter-column fluidic links is carried out, for example, by adjusting the diameter of these links for a given flow rate.

When treating a relatively viscous mixture to be separated as described above, using relatively small fluidic link diameters leads to an increase in the velocity of the fluids, but also in the pressure in the installation. Therefore, the search for a good fluid velocity/fluid viscosity pair requires optimization work. In the context of the mixtures to be separated described above, it has been found that the fluid velocities indicated above are adequate.

It is also advantageous if the total volume of the inter-column fluidic links is less than 10% of the total volume of the columns, preferably less than 5%, or even 3% of the total volume of the columns. This makes it possible to avoid a drop in the performance of up to one or two points of purity or efficiency. The adjustment of these dead volumes may be carried out by minimizing the total length of the inter-column fluidic links (notably pipes or conduits).

Preferably, the fluid velocity and dead volume values above are associated with columns having a diameter greater than or equal to 1 m (useful diameter, or diameter of the stationary phase bed in the columns).

Setting the Chromatographic Purification

The fluid flow rates in the different columns of the chromatographic system may be adjusted in order to obtain the following operating parameters.

The ratio of the mass flow rate of eluent to the mass flow rate of dry matter of the extract may be from 0.5 to 0.6; or from 0.6 to 0.7; or from 0.7 to 0.8; or from 0.8 to 0.9; or from 0.9 to 1.0; or from 1.0 to 1.1; or from 1.1 to 1.2; or from 1.2 to 1.3. Ranges of 0.5 to 1.3, especially 0.6 to 1.2, are examples of preferred ranges.

The injected volume of eluent may be, notably, from 0.12 to 0.14 BV; or from 0.14 to 0.16 BV; or from 0.16 to 0.18 BV; or from 0.18 to 0.20 BV; or from 0.20 to 0.22 BV, or from 0.22 to 0.24 BV.

The volume of feedstock to be treated may be, notably, from 0.13 to 0.16 BV; or from 0.16 to 0.18 BV; or from 0.18 to 0.20 BV; or from 0.20 to 0.22 BV; or from 0.22 to 0.24 BV; or from 0.24 to 0.26 BV; or from 0.26 to 0.28 BV; or from 0.28 to 0.30 BV; or from 0.30 to 0.32 BV; or from 0.32 to 0.34 BV; or from 0.34 to 0.36 BV; or from 0.36 to 0.38 BV; or from 0.38 to 0.40 BV.

The chromatographic purification is preferably carried out at a temperature (called operating temperature) greater than or equal to 50° C.; and, notably, from 50 to 53° C.; or from 53 to 55° C.; or from 55 to 58° C., or from 58 to 60° C.; or from 60 to 62° C.; or from 62 to 65° C.; or from 65 to 70° C. A temperature of about 60° C. is an example of a particularly suitable operating temperature. The above operating temperature corresponds to the average temperature of the mobile phase in the chromatographic system.

Mixture to be Separated

The mixture to be separated is a composition comprising a product of interest and at least one impurity in a solvent. Preferably the solvent is water or an aqueous solution.

The mixture to be separated has a viscosity at 20° C. of greater than or equal to 3 mPa·s. In some preferred embodiments, the mixture to be separated has a viscosity at 60° C. from 1 to 40 mPa·s, notably from 2 to 13 mPa·s. In some preferred embodiments, the mixture to be separated has a viscosity such that, if the concentration of the mixture to be separated increases by 15%, this viscosity approximately doubles.

By way of comparison, the eluent preferably has a viscosity at 20° C. of less than 5 mPa·s. The viscosity of the eluent at 20° C. may thus be, notably, from 0.1 to 3 mPa·s, preferably from 0.5 to 2 mPa·s, more preferably from 0.8 to 1.2 mPa·s, and ideally about 1 mPa·s.

The product of interest and the impurity(ies) may be chosen notably from:

monosaccharide sugars, for example glucose, fructose, deoxyribose, ribose, arabinose, xylose, lyxose, ribulose, xylulose, allose, altrose, galactose, gulose, idose, mannose, talose, psicose, sorbose or tagatose, and/or sugar polysaccharides, for example ungalacto-oligosaccharide, fructooligosaccharide or hydrolyzate of wood, and/or proteins, and/or amino acids, and/or organic acids such as citric acid, and/or mineral salts, and/or ionized species, and/or alcohols and/or glycols, and/or organic acids derived from natural or enzymatic or fermentary media.

In some embodiments, the mixture to be separated comprises one or more monosaccharides. Preferably, the extract and the raffinate are enriched in different monosaccharides.

Advantageously, the monosaccharide comprises 5 or 6 carbon atoms. Preferably, the monosaccharide is chosen from glucose, fructose, deoxyribose, ribose, arabinose, xylose, lyxose, ribulose, xylulose, allose, altrose, galactose, gulose, idiosis, mannose, talose, psicosis, sorbose, tagatose and a mixture of these.

In some particularly advantageous embodiments, the mixture to be separated comprises glucose and fructose; preferably, the extract is enriched in fructose (and depleted in glucose) and the raffinate is enriched in glucose (and depleted in fructose).

The dry matter mass concentration of the mixture to be separated is equal, within 5%, to the threshold concentration $C_d$ defined above, at the operating temperature of the chromatographic purification. In other words, the dry matter mass concentration of the mixture to be separated is in the range from $C_d-5\%$ to $C_d+5\%$, preferably from $C_d-4\%$ to $C_d+4\%$, more preferably from $C_d-3\%$ to $C_d+3\%$, more preferably from $C_d-2\%$ to $C_d+2\%$, more preferably from $C_d-1\%$ to $C_d+1\%$. In some embodiments, this concentration may be approximately equal to $C_d$.

The dry matter mass concentration of the mixture to be separated may be especially from 40 to 58%, preferably from 45 to 55%, more preferably from 48 to 52%, and more preferably about 50%.

In general, the dry matter mass concentration of a composition corresponds to the mass of dry matter of the composition based on the total mass thereof. When it comes to sugar compositions, the dry matter mass concentration is approximately equal to the sugar content in Brix degrees.

In some embodiments, the dry matter mass concentration of the mixture to be separated is adjusted by concentration (notably evaporation) or by dilution (by addition of solvent, preferably water) prior to injection, in order to work in the ranges defined above.

In some embodiments, the mixture to be separated contains the following mass proportions (relative to the dry matter):

from 40 to 65%, preferably from 45 to 60%, more preferably from 50 to 55% and for example approximately 53% of glucose; and/or from 30 to 55%, preferably from 35 to 50%, more preferably from 40 to 45% and, for example, approximately 42% of fructose; and/or from 1 to 10%, preferably from 3 to 8%, more preferably from 4 to 6% and, for example, about 5% of polysaccharides.

In general, the mixture to be separated may notably be any feedstock (preferably of industrial origin) containing fructose and at least one other sugar, such as glucose.

The mixture to be separated may, notably, be obtained by isomerization and/or hydrolysis from a glucose and/or sucrose composition. The composition of glucose and/or sucrose may, notably, come from a step of saccharification of a raw material such as corn, wheat, potato, sugar cane, fruit or other vegetable raw materials. The mixture to be separated may also come from a mother liquor crystallization from a line of crystallized sugar.

Concentration steps by evaporation and/or demineralization may be provided to obtain the mixture to be separated.

The invention may be more particularly applied to the production of a fructose composition from an initial composition comprising glucose.

First Method for Producing a Fructose Composition

Figure 3:
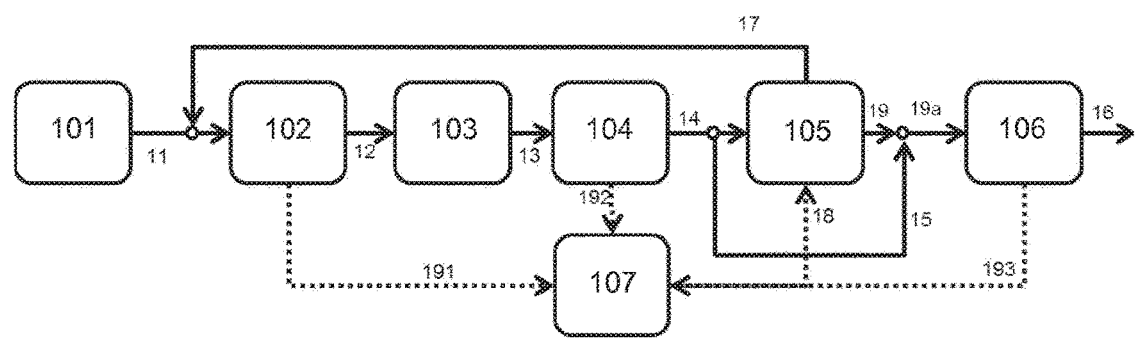
FIG. 3 schematically shows an installation for the production of a fructose composition in some embodiments.

Making reference to FIG. 3, an installation for implementing a first method for producing a fructose composition may, for example, comprise the following elements:

a source 101 of initial composition comprising glucose;

a first evaporator 102 fed by a feed line of initial composition comprising glucose 11 originating from the source 101 of initial composition comprising glucose;

a collection line of concentrated initial composition 12 at the outlet of the first evaporator 102;

an isomerization reactor 103 fed by the collection line of concentrated initial composition 12;

a collection line of intermediate composition 13 at the outlet of the isomerization reactor 103;

a second evaporator 104 supplied by the collection line of intermediate composition 13;

a collection line of concentrated intermediate composition 14 at the outlet of the second evaporator 104;

a multicolumn chromatography system 105 (as described above) supplied by the collection line of concentrated intermediate composition 14 as well as by a line of eluent 18;

a collection line of extract 19 and a collection line of raffinate 17 from the multicolumn chromatography system 105, the raffinate collection line 17 optionally ensuring recycling towards the feed line of initial composition 11;

a third evaporator 106 fed by a feed line 19a, that is itself fed by the collection line of extract 19;

a collection line of fructose composition 16 at the outlet of the third evaporator 106;

a first purge line 191, a second purge line 192 and a third purge line 193 at the respective outlets of the first evaporator 102, the second evaporator 104 and the third evaporator 106; and optionally, a bypass line of concentrated intermediate composition 15 coming from the collection line of concentrated intermediate composition 14 and directly feeding the feed line 19a (in combination with the collection line of extract 19) upstream of the third evaporator Alternatively, one or more intermediate devices may be arranged on the line 15. By way of example, a buffer tank may be provided for storing the intermediate composition.

Thus, according to this method, an initial composition comprising glucose first undergoes a concentration step in the first evaporator 102, at the end of which a concentrated initial composition is recovered. This is brought to the isomerization reactor 103, in which part of the glucose is converted to fructose in an isomerization step. At the outlet of the isomerization reactor 103, a so-called intermediate composition is recovered. This intermediate composition undergoes a concentration step in the second evaporator 104, at the end of which a concentrated intermediate composition is recovered. This is brought to the multicolumn chromatographic system 105, which is separately eluent fed, i.e. water.

A chromatographic purification is carried out in the multicolumn chromatographic system 105, at the output of which an extract and a raffinate are recovered. This purification may be carried out as described above, the concentrated intermediate composition constituting the mixture to be separated.

The raffinate is enriched in glucose relative to the intermediate composition, while the extract is enriched in fructose. The raffinate may be recycled by combining it with the initial composition before the first concentration step.

The extract may be combined with a portion of the concentrated intermediate composition to adjust the fructose concentration to a desired level and then this flow is subjected to a concentration step in the third evaporator 106, at the end of which the desired fructose composition is recovered. This is particularly useful when it is desired to obtain a low final purity in fructose (e.g. composition of the type HFS 55).

Alternatively, and contrary to what is illustrated in the figure, the extract may be directly subjected to the concentration step in the third evaporator 106, at the end of which the desired fructose composition is recovered, without combining it with another flow. This is particularly useful when it is desired to obtain a high final purity in fructose (e.g. composition of the type HFS 95).

In the context of the production of high purity fructose, the bypass line of intermediate composition 15 of FIG. 3 may be omitted and the collection line of raffinate 17 may allow recycling to saccharification and/or demineralization units upstream of the source 101. In order to avoid a concentration of polysaccharides due to this recycling, a nanofiltration unit or a chromatographic separation unit may be placed on this collection line of raffinate 17, for example, in order to eliminate the polysaccharides.

Water 107 is recovered from the first purge line 191, the second purge line 192, and the third purge line 193, and may be used as eluent source for the multicolumn chromatographic system 105 or as any another source of water that may be used in the installation or nearby unit operations.

Second Method for Producing a Fructose Composition of the Invention

Since the invention provides for working with a mixture to be separated having a dry matter mass concentration close to the threshold concentration defined above, the invention makes it possible to eliminate the concentration step between the isomerization and the chromatographic purification, and thus the elimination of the second evaporator. The third evaporator in the above method then preferably becomes the second evaporator in the second method. Preferably, the installation thus contains only these two evaporators (and the corresponding method comprises only the two corresponding evaporation steps).

Figure 4:
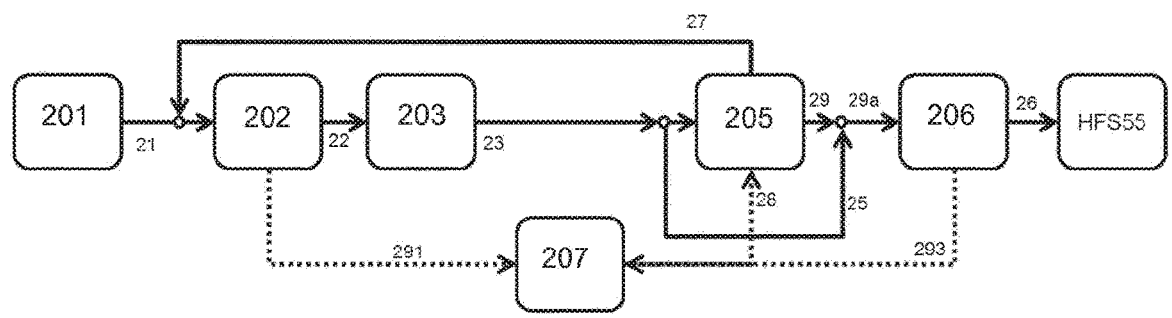
FIG. 4 schematically shows an installation for the production of a fructose composition in other embodiments.

Thus, making reference to FIG. 4, an example of an installation for implementing the second method for producing fructose composition may comprise the following elements:

- a source 201 of initial composition comprising glucose;
- a first evaporator 202 fed by a feed line of initial composition comprising glucose 21 coming from the source 201 of initial composition comprising glucose;
- a collection line of concentrated initial composition 22 at the outlet of the first evaporator 202;
- an isomerization reactor 203 fed by the collection line of concentrated initial composition 22;
- a collection line of intermediate composition 23 at the outlet of the isomerization reactor 203;
- a multicolumn chromatography system 205 (as described above) fed by the collection line of intermediate composition 23 as well as by a line of eluent 28;
- a collection line of extract 29 and a collection line of raffinate 27 coming from the multicolumn chromatography system 205, the collection line of raffinate 27 optionally providing recycling to the feed line of initial composition 21;
- a second evaporator 206 fed by a feed line 29a, that is itself fed by the collection line of extract 29;
- a collection line of fructose composition 26 at the outlet of the second evaporator 206;
- a first purge line 291 and a second purge line 293 respectively output from the first evaporator 202 and the second evaporator 206; and
- optionally, a bypass line of intermediate composition 25 coming from the collection line of intermediate composition 23 and directly feeding the feed line 29a (in combination with the collection line of extract 29) upstream of the second evaporator 206. Alternatively, one or more intermediate devices may be disposed on the line 25. By way of example, a buffer tank may be provided for storing the intermediate composition.

Thus, an initial composition comprising glucose first undergoes a concentration step in the first evaporator 202, at the end of which a concentrated initial composition is recovered. This is brought to the isomerization reactor 203, in which part of the glucose is converted to fructose, in an isomerization step. The isomerization of glucose to fructose is not complete. At the outlet of the isomerization reactor 203, a so-called intermediate composition is recovered. This is brought to the multicolumn chromatographic system 205, which is separately eluent fed, i.e. water.

A chromatographic purification is carried out in the multicolumn chromatographic system 205, at the outlet of which an extract and a raffinate are recovered. The raffinate is enriched in glucose relative to the intermediate composition, while the extract is enriched in fructose. The raffinate is optionally recycled by combining it with the initial composition before the first concentration step.

The extract may be combined with a portion of the intermediate composition in order to adjust the fructose concentration to a desired content, and then this flow is subjected to a concentration step in the second evaporator 206, at the end of which the desired fructose composition is recovered. This is particularly useful when it is desired to obtain a low final purity in fructose (e.g. composition of the type HFS 55).

Alternatively, and contrary to what is illustrated in the figure, the extract may be directly subjected to the concentration step in the second evaporator 206, at the end of which the desired fructose composition is recovered, without combining it with another flow. This is particularly useful when it is desired to obtain a high final purity in fructose (e.g. composition of the type HFS 95).

In the context of the production of high purity fructose, the bypass line of intermediate composition 25 of FIG. 4 is eliminated and the collection line of raffinate 27 may allow recycling towards saccharification and/or demineralization units upstream of the source 201. In order to avoid concentration of the polysaccharides as a result of this recirculation, a nanofiltration unit or a chromatographic separation unit may be placed on this collection line of raffinate 27, for example, in order to eliminate the polysaccharides.

Water 207 is recovered from the first purge line 291 and the second purge line 293. This recovered water may be used as the eluent source for the multicolumn chromatographic system 205; alternatively, fresh water may be used in whole or in part for the eluent.

Preferably, a demineralization step (not shown in the figure) may be carried out between the isomerization step 203 and the chromatography step 205. The demineralization system thus comprises columns filled with ion exchange resin, cationic and/or anionic, as a stationary phase.

The mass ratio of the intermediate composition part that is optionally collected (in the bypass line of intermediate composition 25) (and optionally combined with the extract) relative to the total intermediate composition (in the collection line of intermediate composition 23) may, in particular, be from 0.4 to 0.6, preferably from 0.45 to 0.55, more preferably from 0.48 to 0.52, in particular when the fructose mass content of the total intermediate composition is close to 42%. This mass ratio may, in particular, be from 0.45 to 0.65, preferably from 0.50 to 0.65, more preferably from 0.57 to 0.61, in particular when the fructose mass content of the intermediate composition total is close to 44%.

Preferably, in the first method as in the second method, a step of removing the residual color of the extract (or discoloration) is carried out prior to the concentration of the extract in the third evaporator 106, respectively the second evaporator 206. This may be carried out by arranging a bleaching unit (not shown in the figure) between the multicolumn chromatography system 105, 205 and the evaporator 106, 206 downstream thereof. The discoloration may comprise passing the extract flow over a cationic exchange and/or anionic exchange resin and/or on a bed of activated carbon in the form of powder or grains. Sterile filtration may be associated with this step.

The evaporators 102, 104, 106, 202, 206 may be plate or tubular, single effect or multiple effects, single pass or recirculation, steam or mechanical vapor recompression, with or without thermocompressor.

The isomerization reaction is preferably an enzymatic reaction. An enzyme such as isomerase is put in contact with the product in a reactor, preferably at a temperature between 50 and 60° C., preferably at a pH between 7 and 8. Enzymes such as Novoszymes Sweetzyme® or Gensweet® from Genencor are used for this operation.

The method is preferably continuous.

In the second method, the intermediate composition obtained at the end of the isomerization step does not undergo a concentration step by evaporation of water prior to the chromatographic purification step. In other words, no evaporator is provided between the isomerization reactor 203 and the multicolumn chromatography system 205.

It is possible that the collection line of intermediate composition 23 directly links the isomerization reactor 203 to the multicolumn chromatography system 205 without any intermediate devices. Alternatively, one or more intermediate devices may be arranged between the isomerization reactor 203 and the multicolumn chromatography system 205. By way of example, a buffer tank may be provided for storing the intermediate composition.

Preferably, in the second method, the dry matter mass concentration of the intermediate composition at the inlet of the multicolumn chromatography system 205 is equal to the dry matter mass concentration of the intermediate composition at the outlet of the isomerization reactor 203, if necessary within ±5%, or within ±4%, or within ±3%, or within ±2%, or within ±1%, or exactly.

The above tolerance is expressed as percentages of dry matter. To take an example, if a composition has a dry matter mass concentration of 50% to within ±5%, it means that the composition has a dry matter mass concentration of 45 to 55%.

It is possible to envisage, for example, a slight dilution of the intermediate composition before the multicolumn chromatography system 205, for example by a supply of water. However, it is preferred for more simplicity that no active adjustment of the dry matter mass concentration of the intermediate composition is carried out between the isomerization reactor 203 and the multicolumn chromatography system 205.

Compositions Involved in the Methods for Producing Fructose Composition of the Invention The initial composition used in the first method and in the second method above comprises glucose. It is preferably an aqueous composition. It is preferably a glucose syrup with a high dextrose level. It preferably has a dry matter mass concentration from 25 to 35%, preferably from 28 to 33%, and more preferably about 31%.

The initial composition used in the above methods preferably contains a mass proportion of glucose (relative to dry matter) greater than or equal to 50%, or 80%, or 90%. More preferably, it contains a mass proportion of glucose of approximately 95%. Preferably, the rest of the dry matter is mainly composed of polysaccharides.

After the concentration step, the concentrated initial composition is obtained. It has essentially the same composition in sugars as the initial composition, but it has a higher dry matter mass concentration, for example from 40 to 58%, preferably from 45 to 55%, more preferably from 48 to 52%, and more preferably about 50%.

The intermediate composition, which is obtained at the end of the isomerization, also comprises a dry matter mass concentration, for example from 40 to 58%, preferably from 45 to 55%, more preferably from 48 to 52%, and more preferably about 50%. Preferably, the dry matter mass concentration of the intermediate composition at the end of the isomerization is substantially identical to the dry matter mass concentration of the concentrated initial composition.

During the isomerization step, part of the glucose is converted to fructose. In some embodiments, the intermediate composition contains a mass proportion of glucose (relative to the dry matter) from 40 to 65%, preferably from 45 to 60%, more preferably from 50 to 55% and, for example, about 53%. In some embodiments, the intermediate composition contains a mass proportion of fructose (relative to the dry matter) from 30 to 55%, preferably from 35 to 50%, more preferably from 40 to 45% and, for example, about 42%. In some embodiments, the intermediate composition contains a mass proportion of polysaccharides (based on dry matter) from 1 to 10%, preferably 3 to 8%, more preferably from 4 to 6%, and, for example, about 5%.

At the end of the chromatographic purification, a fructose-enriched extract is obtained and thus depleted in glucose, and a glucose-enriched raffinate and thus depleted in fructose.

In some embodiments, the recovered fructose composition (obtained after concentrating the extract in collection line of fructose composition 26) has a dry matter mass concentration of at least 75%, preferably of at least 76%, for example about 77%.

In some embodiments, the recovered fructose composition contains a mass proportion of glucose (based on dry matter) from 35 to 48%, preferably from 38 to 45%, more preferably from 39 to 42%, for example about 40%. In some embodiments, the recovered fructose composition contains a mass proportion of fructose (based on dry matter) from 50 to 60%, preferably from 52 to 58%, more preferably from 54 to 56%, for example about 55%. In some embodiments, the recovered fructose composition contains a mass proportion of polysaccharides (based on dry matter) from 2 to 8%, preferably from 3 to 7%, more preferably from 4 to 6%, for example about 5%.

In other embodiments, the recovered fructose composition contains a mass proportion of fructose (relative to dry matter) greater than or equal to 95%, preferably 96%, more preferably 97%, more preferably 98%, more preferably 98.5%.

Preferably, at least 80% by mass of the fructose contained in the mixture to be separated is recovered in the extract, more preferably at least 90% by mass.

EXAMPLES

The following examples illustrate the invention without limiting it. In all the examples, a chromatographic purification system of the SSMB type was used. The system comprises four columns filled with Novasep Process resin XA2004-30Ca or XA2004-31Ca as a stationary phase, over a bed height of two meters in each column.

The respective volumes of mobile phase in zones 1, 2, 3 and 4 are denoted by $BV_1$, $BV_2$, $BV_3$ and $BV_4$. In the examples below, the volume of eluent (denoted $BV_{water}$ and equal to $BV_1-BV_4$) is adjusted in a range from 0.11 to 0.25. The volume of feedstock to be treated (denoted $BV_{feed}$ and equal to $BV_3-BV_2$) is adjusted in a range from 0.11 to 0.30. The flow rates $BV_1$ and $BV_2$ are scanned in the following ranges: from 0.65 to 0.75 and from 0.55 to 0.65. The volumes $BV_3$ and $BV_4$ are calculated as follows: $BV_3=BV_2+BV_{feed}$ and $BV_4=BV_1-BV_{water}$.

The adjustments of $BV_1$ and $BV_2$ fluctuate from one system to another for reasons of stationary phase density variability. On the other hand, this variability does not have any impact on the performances due to the volume of water and the feedstock volume used.

For each adjustment performed, purities and yields are measured experimentally, but the purities and yields are not in themselves significant in characterizing the invention. In fact, regardless of the fructose purity of the extract obtained at the chromatography outlet, a partial mixture with the non-enriched mixture is carried out before the final evaporation.

For the sake of clarity, the following examples directly show the material balance results corresponding to the best settings obtained. The tables correspond to a daily production of 250 tons of fructose HFS 55 in dry matter composition, which corresponds to 310 tons of liquid HFS 55 at 77% dry matter. The performance of the chromatography is evaluated according to the $t_{water}/t_{HFS}$ ratios (the mass ratio of the daily water flow rate used on the daily dry matter flow rate of the produced fructose composition) and $V_{CHR}/t_{HFS}$ (the ratio of the stationary phase volume in the installation brought back to the mass of dry matter fructose composition produced per day).

In all of the examples, the threshold concentration $C_d$ for the mixture to be treated in question is equal to approximately 50% by mass.

Example 1 (Comparative

This reference example is implemented according to the diagram of FIG. 3 described above (installation with three evaporators, and inlet flow of the chromatographic unit having a dry matter mass concentration of 60%).

In this example, the volume of water (eluent) used ($BV_{water}$) is equal to 0.177 BV and the volume of feedstock to be treated ($BV_{feed}$) is equal to 0.2 BV. The following table summarizes the characteristics of the compositions passing in different lines of the installation. The flow is indicated in metric tons per day. The dry matter level is indicated as a mass percentage relative to the total mass of the composition in question. The fructose, glucose and polysaccharide levels are indicated in mass percentages relative to the dry matter of the composition in question.

| Line | 11 | 12 | 13 | 14 | 15 | 16 | 18 | 193 |
|---|---|---|---|---|---|---|---|---|
| Flow rate | 807 | 694 | 694 | 578 | 296 | 326 | 194 | 326 |
| Dry matter | 31% | 50% | 50% | 60% | 60% | 77% | 0 | 0 |
| Fructose | 0% | 2% | 42% | 42% | 42% | 55% | — | — |
| Glucose | 95% | 92% | 52% | 52% | 52% | 40% | — | — |
| Polysaccharides | 5% | 6% | 6% | 6% | 6% | 5% | — | — |

In this example, the $t_{water}/t_{HFS}$ ratio is equal to 0.78. The $V_{CHR}/t_{HFS}$ ratio is equal to 0.35 m³/t.

Example 2 (Invention

This example is implemented according to the diagram of FIG. 4 described above (installation with two evaporators, and inlet flow of the chromatographic unit having a dry matter mass concentration of 50%).

In this example, the volume of water (eluent) used is equal to 0.15 BV and the volume of feedstock to be treated is equal to 0.25 BV. The following table summarizes the characteristics of the compositions passing in different lines of the installation, in the same manner as in Example 1.

| Line | 21 | 22 | 23 | 25 | 26 | 28 | 293 |
|---|---|---|---|---|---|---|---|
| Flow rate | 807 | 788 | 788 | 358 | 326 | 194 | 326 |
| Dry matter | 31% | 50% | 50% | 50% | 77% | 0 | 0 |
| Fructose | 0% | 7% | 42% | 42% | 55% | — | — |
| Glucose | 95% | 88% | 53% | 53% | 40% | — | — |
| Polysaccharides | 5% | 5% | 5% | 5% | 5% | — | — |

In this example, the $t_{water}/t_{HFS}$ ratio is equal to 0.77. The $V_{CHR}/t_{HFS}$ ratio is equal to 0.3 m³/t.

Compared with Example 1, it appears that despite a drop in the concentration of the product at the inlet of the chromatography (from 60 to 50% of dry matter), while decreasing the total volume of elution water and increasing the one of the batch to be treated, the volume of resin per ton of final product is lower.

Example 3 (Invention

This example is similar to Example 2, except that the volume of water used is equal to 0.14 BV and that the volume of feedstock to be treated is equal to 0.27 BV. The following table summarizes the characteristics of the compositions passing in different lines of the installation, in the same way as in the preceding examples:

| Line | 21 | 22 | 23 | 25 | 26 | 28 | 293 |
|---|---|---|---|---|---|---|---|
| Flow rate | 807 | 782 | 782 | 358 | 326 | 178 | 326 |
| Dry matter | 31% | 50% | 50% | 50% | 77% | 0 | 0 |
| Fructose | 0% | 7% | 42% | 42% | 55% | — | — |
| Glucose | 95% | 88% | 53% | 53% | 40% | — | — |
| Polysaccharides | 5% | 5% | 5% | 5% | 5% | — | — |

In this example, the $t_{water}/t_{HFS}$ ratio is equal to 0.71. The $V_{CHR}/t_{HFS}$ ratio is equal to 0.32 m³/t. This example demonstrates that if the volume of elution water is further lowered, while also increasing the volume of feedstock to be treated (compared to Example 2), the volume of resin per ton of final product is a little superior but the performance obtained on the volume of water per ton of final product remains very advantageous.

Example 4 (Invention

This example is similar to Example 2, except that the volume of water used is equal to 0.14 BV and that the volume of feedstock to be treated is equal to 0.17 BV. In addition, the length of columns is reduced to 1.40 m instead of the 2 m in the previous examples. The following table summarizes the characteristics of the compositions passing in different lines of the installation, in the same way as in the preceding examples:

| Line | 21 | 22 | 23 | 25 | 26 | 28 | 293 |
|---|---|---|---|---|---|---|---|
| Flow rate | 807 | 700 | 700 | 341 | 326 | 264 | 326 |
| Dry matter | 31% | 50% | 50% | 50% | 77% | 0 | 0 |
| Fructose | 0% | 3% | 42% | 42% | 55% | — | — |
| Glucose | 95% | 91% | 52% | 52% | 40% | — | — |
| Polysaccharides | 5% | 6% | 6% | 6% | 5% | — | — |

In this example, the $t_{water}/t_{HFS}$ ratio is equal to 0.96. The $V_{CHR}/t_{HFS}$ ratio is equal to 0.27 m³/t. This example demonstrates that it is possible to work with shorter columns while maintaining good productivity, which makes it possible to obtain good performance in water consumption and particularly optimized with respect to resin requirements. Other settings may be found to lower the water consumption for larger resin volumes.

The invention claimed is:

1. A method for purifying a mixture to be separated, in a multicolumn chromatography system that comprises a plurality of columns and intercolumn fluidic links, the method comprising successively and cyclically:—a step of collecting a raffinate, a step of injecting the mixture to be separated into the multicolumn chromatography system, a step of collecting an extract and a step of injecting eluent into the multicolumn chromatography system, at an operating temperature; wherein the method comprises moving a fluid through the intercolumn fluidic links at a velocity greater than 0.5 m/s; wherein the mixture to be separated has a viscosity at 20° C. greater than or equal to 3 mPa·s; and wherein a dry matter mass concentration of the mixture to be separated is equal, within 5%, to a threshold concentration, said threshold concentration being such that:—a first viscosity of the mixture to be separated, at a second dry matter mass concentration equal to the threshold concentration and at the operating temperature, is equal to twice a second viscosity of the mixture to be separated, at a dry matter mass concentration equal to 85% of the threshold concentration and at the operating temperature.

2. The method of claim 1, wherein the dry matter mass concentration of the mixture to be separated is equal, within 2%, to the threshold concentration.

3. The method of claim 1, wherein the operating temperature is greater than or equal to 50° C.

4. The method of claim 1, wherein the multicolumn chromatography system comprises from 4 to 6 cells; or comprises columns having a length from 1.0 to 2.6 m; or a combination thereof.

5. The method of claim 1, wherein the eluent is water.

6. The method of claim 1, wherein the mixture to be separated has a dry matter mass concentration from 45 to 55%.

7. The method of claim 1, wherein the mixture to be separated comprises glucose and fructose, the extract being enriched in fructose and the raffinate being enriched in glucose.

8. The method of claim 7, wherein the extract contains a mass proportion of fructose, relative to the total dry matter, greater than or equal to 95%.

9. The method of claim 1, wherein a volume of the intercolumn fluidic links is less than 10% of a volume of the columns.

10. The method of claim 7, wherein at least 85% by mass of the fructose contained in the mixture to be separated is recovered in the extract.

11. The method of claim 1, wherein the mixture to be separated comprises:—a mass proportion of glucose relative to a total dry matter from 40 to 65%; or—a mass proportion of fructose relative to a total dry matter from 30 to 55%, or a combination thereof.

12. The method of claim 1, wherein:—an injected volume of eluent is from 0.12 to 0.22 BV; or—an injected volume of mixture to be separated is from 0.13 to 0.40 BV, or a combination thereof.

* * * * *